United States Patent Office 3,021,234
Patented Feb. 13, 1962

3,021,234
EPOXY COATING COMPOSITION AND METHOD OF COATING ELECTRICAL ARTICLE THEREWITH
James S. Casement and James R. Hinkley, St. Paul, Minn., assignors to Minnesota Mining and Manufacturing Company, St. Paul, Minn., a corporation of Delaware
No Drawing. Filed Oct. 24, 1957, Ser. No. 692,039
7 Claims. (Cl. 117—232)

This application is a continuation-in-part of our application, Serial No. 523,368, filed July 20, 1955, and now abandoned.

This invention relates to liquid epoxy resin dipping compositions which possess lengthy pot life at room temperature, form thick uniform coatings from a single dip, and cure rapidly at raised temperatures to a solid tough non-porous state. The invention further relates to a process of dipping in which our compositions are employed.

The compositions hereof are particularly useful in coating electrical apparatus where thick uniform protecting and insulating coatings are required. Using our compositions it is possible to provide a uniform insulating coating of adequate thickness upon an article by simply dipping the article in a pot of our liquid mixture, permitting any excess material to drop off the dipped article, and curing the resin coating by heating the coated article at a raised temperature, for example, at approximately 150–350° F. for up to two hours.

Heretofore, uniform insulating resinous coatings of the required thickness have been applied to articles by processes involving multiple separate dips in a fluid resin, each dipping followed by curing in an oven. Using such technique, problems have arisen with respect to oven drippings during the heat cure step and also with respect to obtaining uniformly thick insulating coatings. Such problems are essentially non-existent when our coating composition is employed. Our coating remains uniformly distributed upon the surface of a dipped article while being heated in an oven at raised temperature, and no problem arises with respect to oven drippings. Uniformly thick non-porous solid insulating coatings between approximately 10 and 40 mils can be applied to articles by a single dipping and curing step when using our composition. Uncured coatings of our composition between 10 and 40 mils thick resist vertical laminar flow even at raised temperatures encountered in curing. They do not slide off vertical surfaces under their own weight.

These novel properties exhibited by our compositions are the more unusual when consideration is given to the ingredients from which our compositions are formed. The primary resin base employed is a liquid epoxy resin. While cured epoxy resins are widely known for the advantageous insulating properties they possess, no one to our knowledge has successfully compounded liquid epoxy resin mixtures which possess long pot life at room temperature, which cure rapidly at raised temperatures to form tough solid non-porous insulation, and which also successfully overcome vertical laminar flow prior to curing even when built up to thicknesses on the order of 10–40 mils on a surface.

Our compositions also contain a polycarboxylic acid anhydride. Anhydrides present in epoxy compositions are known to function at raised temperatures as curing agents for epoxy material; however, they do not cause rapid curing of epoxides even at raised temperatures as may be demonstrated by formulating a mixture of epoxy resin such as set forth in Example 1 below and the anhydride of that example, and heating it for five hours at 350° F. At the end of that time, a thickening of the composition is in evidence but it still remains largely in an uncured viscous condition.

As a third required component we employ an ammonium, cation-modified base-exchange clay, i.e., a tertiary amine substituted clay or a quaternary ammonium clay as defined below. Heretofore modified clays have been used in paint-type compositions wherein volatile organic solvents are present. These paint compositions have indeed relied upon the polarity introduced by such volatile organic solvents for the attainment of desired thixotropy. Even though we do not employ such volatile organic solvents in our compositions, we have nevertheless been successful in forming desired thixotropic epoxy resin mixtures using certain ammonium cation-modified base-exchange clays. Our mixtures actually consist of ingredients which are either solid in nature or curable into a solid state, and do not contain volatilizing organic solvents which interfere with the obtaining of required dense insulation. While our mixtures are thixotropic at room as well as elevated temperatures, they are sufficiently fluidizable (as by stirring or agitation) at room temperature to permit of dipping a coil or other article therein to accomplish filling and/or covering of the article with an insulating coating. When an article is thus dipped and removed from our compositions, the adhering coating does not run off but remains uniformly distributed over the surface. This is true both at room temperature and as the temperature of the resin is raised to the degree required for cure.

We have found that when both an anhydride and an ammonium cation-modified base-exchange clay are used according to the teachings herein, the curing rate of the composition is substantially increased. For example, such a composition cures to a tough solid non-porous state within two hours or less at 250° F. The composition nevertheless still possesses a pot life at room temperature of approximately one to five days or more.

While the ammonium cation-modified base-exchange clay in our compositions functions to greatly hasten curing at elevated temperatures, it nevertheless does not serve alone as a rapidly acting curing agent for liquid epoxy resins. Its function as a curing accelerator comes into evidence when employed in combination with anhydrides as herein taught.

During the process of raising our composition to curing temperatures, no vertical laminar flow is in evidence. The ammonium cation-modified base-exchange clay appears to impart resistance to fluid flow while at the same time increasing the rate of reaction at curing temperature.

To more fully illustrate our new compositions, but not to limit the invention hereof, the following examples are offered:

EXAMPLE 1

Part A

| | Parts by weight |
|---|---|
| Liquid epoxy resin | 25.6 |
| Pigment (red iron oxide) | 1.0 |
| Dimethyldioctadecyl ammonium bentonite | 6.6 |
| Total | 33.2 |

Part B

| | |
|---|---|
| Tetrapropenyl succinic anhydride | 31.6 |
| 2,4,6-tri-(dimethylamino-methyl) phenol | 0.4 |
| Dimethyldioctadecyl ammonium bentonite | 13.7 |
| Plasticizer | 21.4 |
| Pigment (carbon black) | 0.1 |
| Total | 67.2 |

The epoxy resin employed had a viscosity of 100–140 poises at room temperature, a 1,2-epoxy equivalency greater than one, and an 8.5% oxirane oxygen content. It is commercially available as "Bakelite" resin, BR–18774. Such a resin may be prepared by the reaction of epichlorhydrin and bisphenol A (2,2-bis (4-hydroxyphenyl) propane) in the presence of sodium hydroxide. The organic layer is then separated and washed with water to remove sodium chloride generated during the reaction. Vacuum distillation may be used to remove residual water and excess epichlorhydrin. The preparation of this class of polymers is well known.

The dimethyldioctadecyl ammonium bentonite, an ammonium cation-modified base-exchange clay, had a specific gravity of 1.8, contained less than 3% water by weight and was used in a minus 200 mesh particle size.

The tetrapropenyl succinic anhydride was prepared by heating together equimolar portions of maleic anhydride and the tetramer of propylene in the presence of hydroquinone at 185–220° C., and the product distilled.

2,4,6-tri-(dimethylamino-methyl) phenol is known to act as a curing accelerator or catalyst in epoxy compositions. In this example, however, the dimethyldioctadecyl ammonium bentonite and the 2,4,6-tri-(dimethylamino-methyl) phenol act together as curing accelerators to effect desired rapid cure of the composition at raised temperatures.

The plasticizer employed was a reaction product of a mixture of two mols of maleic anhydride with about 1.23 mols of ploypropylene glycol, reacted at 305° F. The product had an acid number of 1.53.

The ingredients of Part A in this example were stirred together and then passed through a paint mill twice. The rollers on the paint mill were adjusted to give a hard working, i.e., the spacing between the rollers was reduced to a minimum. Further passes through the paint mill produced no further change in consistency. This milled mixture at the end of seven days at 250° F. showed no curing and only a very slight increase in viscosity.

Part B components of the formula of this example were also mixed, blended and worked according to the procedure used in forming the components of Part A into a "homogeneous" mixture which remained unchanged with further working on the paint mill. Thereafter Part A and Part B were stirred together to form the dipping composition hereof. After standing a few moments without stirring, this composition was highly viscous and could not easily be poured. However, an electrical coil or other article dipped into such a mixture is completely and uniformly coated, and when withdrawn from the mixture is found to retain a thick and uniform sheath or coating of the resinous composition.

As an illustration of the advantageous properties possessed by this composition, a solenoid coil was heated to 275° F., then dipped in the composition of this example (held at room temperature), and thereafter placed in an oven at 250° F. for one hour. The coil was uniformly coated with a thickness of resin of approximately 20 mils by the single dipping. During the heating step no vertical laminar flow was in evidence and none of the composition dripped off the article in the oven.

EXAMPLE 2

Part A

| | Parts by weight |
|---|---|
| Liquid epoxy resin | 18.0 |
| Pulverized mica | 15.0 |
| Pigment (red iron oxide) | 1.0 |
| Total | 34.0 |

Part B

| | |
|---|---|
| Tetrapropenyl succinic anhydride | 28.0 |
| 2,4,6-tri-(dimethylamino-methyl) phenol | .2 |
| Water ground mica | 35.7 |
| Dimethyldioctadecyl ammonium bentonite | 2.0 |
| Pigment (carbon black) | .1 |
| Total | 66.0 |

The constituents of this example other than the mica were the same as those constituents employed in Example 1. The mica was employed in a size smaller than about 20 microns. Instead of pulverized mica, other pulverized inorganic inert fillers may be used, if desired.

Ingredients of each part of the formula above were stirred together and then worked on a paint mill until the mixtures remained unchanged with further working. Part A was then stirred with Part B to form the heat curable dipping composition hereof.

Electrical coils were likewise dipped in this composition, held for a few seconds above the pot to allow excess build-up to drop off, and placed in an oven at 250° F. for one hour. This composition possessed the advantages of the composition set forth in Example 1, yet only a very small amount of the ammonium cation-modified base-exchange clay was employed in the formula hereof.

EXAMPLE 3

Another composition according to this invention was made using 18.9 parts by weight of the epoxy resin employed in Example 1, 28.3 parts of the anhydride employed in that example, 49.1 parts of water ground mica and 5.7 parts of dimethyldioctadecyl ammonium bentonite. The ingredients were all blended and worked together on a paint mill until no further change in the properties of the mass was obtained by further working, and the resulting composition tested for its dipping properties. An electric coil, first heated to 275° F., was dipped in the composition and then placed in an oven at 250° F. for one hour. The coating on the coil cured to a tough, non-porous, abrasion-resistant state, having good resistance to mechanical and thermal shock. This example illustrates what is believed to be a catalytic function of the ammonium cation-modified base-exchange clay in the compositions hereof. Without the ammonium cation-modified base-exchange clay, the other ingredients of this formula failed to cure even after five hours at 250° F.

EXAMPLE 4

Part A

| | Parts by weight |
|---|---|
| Liquid epoxy resin | 29.77 |
| Talc | 20.00 |
| Pigment (red iron oxide) | 0.21 |
| Pigment (carbon black) | 0.02 |
| Total | 50.00 |

Part B

| | |
|---|---|
| Allo-ocimene adduct of maleic anhydride | 11.80 |
| Myrcene adduct of maleic anhydride | 3.40 |
| Hexahydrophthalic anhydride | 14.80 |
| 2,4,6-tri-(dimethylamino-methyl) phenol | 0.14 |
| Talc | 18.75 |
| Dimethyldioctadecyl ammonium bentonite | 1.25 |
| Silicone oil | 0.01 |
| Total | 50.15 |

The liquid epoxy resin employed had a viscosity of 100–200 poises at room temperature, a 1,2-epoxy equivalency greater than one, an oxirane oxygen content of about 8.5%, and a melting point of about 8°–12° C. It is available commercially from the Shell Chemical Corportion as "Epon 828" and is formed by reaction between epichlorhydrin and Bisphenol A.

The silicone oil in the above formula was a dimethyl siloxane fluid having a viscosity of about 12,500 centistokes at 100° F. Suitably "DC–200" silicone fluid marketed by the Dow Corning Chemical Co. may be used.

The ingredients of Part A were ground together to form a smooth dispersion by passing them in admixture between rollers of a paint mill, as in Example 1.

The three anhydrides and the 2,4,6-tri-(dimethylamino-methyl) phenol of the Part B ingredients were heated together to about 250° F., while stirring until melted, thereby to obtain a uniform blend. The blend was then cooled to room temperature, at which it remained liquid. Thereafter this blend and the remaining ingredients of Part B were mixed, and the resulting blend of Part B ingredients was mixed and blended together with Part A by passing the whole mixture twice through tightly-set paint rollers. The resulting composition exhibited the advantageous properties characteristic of the other illustrative compositions hereof.

This example further emphasizes that only a very small amount of ammonium cation-modified base-exchange clay is needed for the attainment of a dipping composition satisfying the aforenoted requirements. Experiments have shown that as little as one part of such cation-modified clay for every 100 parts of liquid epoxy resin is frequently sufficient to impart the novel properties to epoxy-anhydride compositions, as aforediscussed.

Instead of employing the reaction product of epichlorhydrin and bisphenol A as demonstrated in the examples, we may employ other liquid epoxy resins. Reaction products resulting from the reaction between epichlorhydrin and such polyhydric phenols as resorcinol, 2,2-bis-(4-hydroxy-phenyl) butane, as well as various tris-phenols, may be employed. Glycol, glycerol, etc., also may be used as the polyhydroxy constituent in the reaction with epichlorhydrin, which may be conducted in the presence of boron trifluoride catalyst and the resulting product converted with alkaline reagent to a liquid glycidyl polyether.

While epichlorhydrin is generally used in the reaction, equivalent reactive material containing an epoxy group, also called an oxirane group, may be employed.

The epoxy resins in our compositions are normally liquid at room temperature and have a 1,2-epoxy equivalency greater than one. Bq 1,2-epoxy equivalency of the epoxy resins is meant the average number of

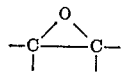

groups per molecule of the resin. In other words, an average of more than one

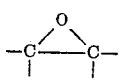

group is present per molecule of the resin. 1,2-epoxy equivalency is determined by heating a weighted sample of the epoxy resin with an excess of 0.2 N pyridinium chloride in chloroform solution at the boiling point under reflux for two hours whereby the pyridinium chloride quantitatively hydrochlorinates the epoxy groups. After cooling, the excess pyridinium chloride is titrated with 0.1 N sodium hydroxide in alcohol to the phenolphthalein end point. The average molecular weight of the resin is also determined and epoxy equivalency is calculated by considering that each molecule of consumed HCl from the pyridinium chloride combines with an epoxy group.

As noted above, both aryl and alkyl polyhydroxy constituents may be reacted with compounds possessing an oxirane oxygen

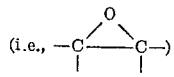

group to give liquid epoxy resins suitable for use in the compositions hereof. The preparation of liquid epoxide resins forms no part of this invention and has been described in many publications. Reference is here made to these ether-type resins as disclosed in U.S. Patent No. 2,633,458, issued on March 31, 1953.

As the polycarboxylic acid anhydride constituent in our compositions we prefer to employ an alkyl succinic anhydride, such as for example tetrapropenyl succinic anhydride, 2-ethyl-hexenyl succinic anhydride, pentenyl succinic anhydride, etc., but other polycarboxylic anhydrides are also suitable to employ. It is most practical to employ liquid polycarboxylic anhydrides in our compositions; however, solid carboxylic acid anhydride mixtures which are themselves liquid may be used. Examples of solid polycarboxylic anhydrides are the allo-ocimene adduct of maleic anhydride, the myrcene adduct of maleic anhydride, phthalic anhydride, hexahydrophthalic anhydride, etc. Solid polycarboxylic anhydrides, where employed, are mixed together in various proportions to form masses which are fluid at room temperature, and the resulting liquid mixture of individually normally solid anhydrides used in our compositions.

As may be noted in Examples 1, 2 and 4, small proportions of tertiary amine curing catalysts such as dimethyl benzyl amine, triethylamine, etc., may be incorporated in these compositions, if desired. Such an agent, however, is not a necessary constituent.

Instead of employing dimethyldioctadecyl ammonium bentonite, we may employ trimethyl-dodecyl ammonium bentonite or other ammonium cation-modified base-exchange clays, preferably montmorillonites, in which the exchangeable inorganic cation of the clay has been exchanged for an ammonium base having a molecular area of at least 70 square angstrom units and having at least 3 hydrocarbon radicals attached to the nitrogen atom. Tertiary amine substituted clays as well as quaternary ammonium clays are within the foregoing definition. Primary and secondary amine substituted clays are excluded, however, as they are inoperable to give the results of this invention. Only by using tertiary amine substituted clays or quaternary ammonium clays, as above specified, is it possible to obtain compositions of the type hereof useful in providing uniform, dense, non-porous, solid insulation for electrical articles. The preparation of organophilic tertiary amine substituted clays and quaternary ammonium clays, preferably from base-exchange clays of the montmorillonite type, may be accomplished according to teachings set forth in U.S. Patent No. 2,531,427 to Ernst A. Hauser.

The proportion of ammonium cation-modified base-exchange clay to epoxy resin in our composition suitably may vary from about 1:100 to about 1:1 parts by weight, the range 1:100 to 35:100 being preferred. In the preferred range, the plastic yield point of the composition still remains high and yet the system is more readily fluidizable by agitation than compositions which contain an amount of cation-modified clay in excess of the upper preferred ratio.

Fillers, pigments, plasticizers, etc., may be incorporated in our composition, as illustrated, to gain additional advantageous properties as imparted by such ingredients. Frequently fillers are desired to aid or improve electrical properties, and talc is a preferred illustration of one such filler.

The foregoing description is offered to teach those skilled in the art how to prepare solvent-free liquid epoxy dipping compounds which resist vertical laminar flow from a dipped article and which rapidly cure at raised temperatures to form tough non-porous insulating coatings. Solvents are to be avoided in our composition for the reason that their presence causes voids in cured insulating coatings and a resulting disruption of uniform electrical properties. Having described our invention, we claim:

1. A self-curing composition free of volatile solvents and adapted for use in providing uniform thick insulating coats for electrical articles, said compositions having a prolonged pot life at normal room temperature and rapidly curing to a tough hard solid when held at moderately elevated temperatures, characterized by being thixotropic and by resisting vertical laminar flow under its own coating weight at thicknesses of 10 to 40 mils even at raised temperatures on the order of 250° F., said composition comprising 100 parts of a liquid epoxy resin having a 1,2-epoxy equivalency greater than one, a mass of liquid epoxy-reactive polycarboxylic acid anhydride, and between 1 and 100 parts of an ammonium cation-modified base-exchange clay in which the exchangeable inorganic cation of the clay has been exchanged for an ammonium base having a molecular area of at least 70 square angstrom units and having at least 3 hydrocarbon radicals attached to the nitrogen atom.

2. The composition of claim 1 containing in addition a small proportion of a tertiary amine curing catalyst.

3. The composition of claim 1 containing in addition a finely-divided inert inorganic filler.

4. The method of coating electrical articles with uniform insulating coatings of between 10 and 40 mils thickness by a single dipping comprising dipping a preheated electrical article into a solvent-free mixture comprising 100 parts of a liquid epoxy resin having a 1,2-epoxy equivalency greater than one, an epoxy reactive polycarboxylic acid anhydride, and between 1 and 100 parts of an ammonium cation-modified base-exchange clay in which the exchangeable inorganic cation of the clay has been exchanged for an ammonium base having a molecular area of at least 70 square angstrom units and having at least 3 hydrocarbon radicals attached to the nitrogen atom, and heating said coated article at a temperature between 150° and 350° F. for a period of time sufficient to cure the coating, said period of time being not in excess of about two hours, and said coating composition remaining in place and resisting vertical laminar flow during said heating step.

5. A self-curing composition free of volatile solvents and adapted for use in providing uniform thick insulating coats for electrical articles, said composition having a prolonged pot life at normal room temperature and rapidly curing to a tough hard solid when held at moderately elevated temperatures, characterized by being thixotropic and by resisting vertical laminar flow under its own coating weight at thicknesses of 10 to 40 mils even at raised temperatures on the order of 250° F., said composition comprising about 100 parts of a liquid epoxy resin having a 1,2-epoxy equivalency greater than one, a mass of liquid epoxy-reactive polycarboxylic acid anhydride, and between about 1 and 35 parts of an ammonium cation-modified base-exchange clay in which the exchangeable inorganic cation of the clay has been exchanged for an ammonium base having a molecular area of at least 70 square angstrom units and having at least 3 hydrocarbon radicals attached to the nitrogen atom.

6. The composition of claim 5 containing in addition a finely-divided inert inorganic filler.

7. The composition of claim 5 containing in addition a small proportion of a tertiary amine curing catalyst.

References Cited in the file of this patent

UNITED STATES PATENTS

| | | |
|---|---|---|
| 2,500,600 | Bradley | Mar. 14, 1950 |
| 2,548,447 | Shokal et al. | Apr. 10, 1951 |
| 2,622,987 | Ratcliffe | Dec. 23, 1952 |
| 2,666,719 | Lissant | Jan. 19, 1954 |
| 2,768,992 | Zukas | Oct. 30, 1956 |
| 2,785,383 | Foster | Mar. 12, 1957 |
| 2,804,404 | Thiessen | Aug. 27, 1957 |
| 2,824,851 | Hall | Feb. 25, 1958 |

FOREIGN PATENTS

| | | |
|---|---|---|
| 678,936 | Great Britain | Sept. 10, 1952 |
| 2,850,707 | Wroblewski et al. | Sept. 2, 1958 |